T867016

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED OCTOBER 28, 1969

867 O.G. 1094

772,032

THERMOGRAPHIC REPRODUCTION PROCESS IN WHICH A COLORED DYE IMAGE IS FORMED

Frank G. Webster and Donald W. Heseltine, both of Kodak Park, Rochester, N.Y. 14650

Filed Oct. 30, 1968. Published Oct. 28, 1969

Int. Cl. G03c *5/16*

U.S. Cl. 250—65

No Drawing. 14 Pages Specification

A process for thermographic reproduction is described in which a colored dye image is formed by exposing to heat a thermosensitive element containing a thermosensitive composition which comprises as a first component a heterocyclic nitrogen compound and as a second component either a ketomethylene compound or a reactive cyclic ammonium quaternary salt. The first component can be a pyrimidinium salt such as pyrimidinium acetate, pyrimidinium p-toluenesulfonate, 1-methyl-pyrimidinium acetate, 2-amino-1-methyl-pyrimidinium p-toluenesulfonate, and the like. The ketomethylene compound can be a barbituric acid such as 1,3-diethylbarbituric acid, 1,3-diphenyl-2-thiobarbituric acid, a 2-pyrazolin-5-one such as 3-methyl-1-phenyl-2-pyrazolin-5-one, a 3-cyano-2(5H)-furanone such as 3-cyano-4-phenyl-2(5H)-furanone, and the like. The cyclic ammonium quaternary salt can be a benzothiazolium salt such as 2,3-dimethylbenzothiazolium p-toluenesulfonate, 3-butyl-2-ethyl-benzothiazolium tetrafluoroborate, and the like.